US012689894B2

(12) United States Patent
Duyk et al.

(10) Patent No.: US 12,689,894 B2
(45) Date of Patent: Jul. 21, 2026

(54) BROKERED SERVICE DISCOVERY AND CONNECTION MANAGEMENT

(71) Applicant: Apple Inc., Cupertino, CA (US)

(72) Inventors: Charles W Duyk, San Francisco, CA (US); Hien M Nguyen, San Jose, CA (US); Huai-Che Lu, Santa Clara, CA (US); Joseph P Saracino, Palo Alto, CA (US); Quang D Tran, San Jose, CA (US)

(73) Assignee: Apple Inc., Cupertino, CA (US)

( * ) Notice: Subject to any disclaimer, the term of this patent is extended or adjusted under 35 U.S.C. 154(b) by 437 days.

(21) Appl. No.: 17/728,799

(22) Filed: Apr. 25, 2022

(65) Prior Publication Data

US 2023/0345241 A1      Oct. 26, 2023

(51) Int. Cl.
*H04W 12/06*      (2021.01)
*H04W 12/77*      (2021.01)
*H04W 48/08*      (2009.01)
*G06F 3/14*      (2006.01)

(52) U.S. Cl.
CPC ........... *H04W 12/06* (2013.01); *H04W 12/77* (2021.01); *H04W 48/08* (2013.01); *G06F 3/14* (2013.01)

(58) Field of Classification Search
None
See application file for complete search history.

(56) References Cited

U.S. PATENT DOCUMENTS

| | | | |
|---|---|---|---|
| 9,491,617 B2 | 11/2016 | Chang | |
| 10,045,216 B1 | 8/2018 | Indurkar | |
| 10,057,813 B1 | 8/2018 | Likar | |
| 10,277,576 B1 * | 4/2019 | Yau | H04L 9/3236 |
| 10,475,315 B2 * | 11/2019 | Madar | G08B 13/196 |
| 10,666,642 B2 * | 5/2020 | Antonyraj | H04W 12/06 |
| 11,188,095 B1 * | 11/2021 | Kwan | H04L 12/2834 |
| 11,244,561 B1 * | 2/2022 | Fuchs | H04N 21/4222 |
| 11,405,789 B1 * | 8/2022 | Wei | H04W 4/50 |
| 11,922,396 B1 * | 3/2024 | Blumenthal | G06Q 20/3223 |
| 11,962,842 B1 * | 4/2024 | Singh | H04N 21/4753 |
| 12,081,971 B2 * | 9/2024 | Huang | H04L 9/0866 |
| 12,124,748 B2 * | 10/2024 | Tsuji | H04W 12/0431 |
| 12,160,736 B2 * | 12/2024 | Takeuchi | H04L 63/105 |
| 12,219,205 B1 * | 2/2025 | Singh | G06F 3/14 |
| 2008/0060065 A1 | 3/2008 | Wynn | |
| 2010/0095359 A1 | 4/2010 | Gordon | |
| 2010/0263022 A1 | 10/2010 | Wynn | |
| 2011/0040870 A1 | 2/2011 | Wynn | |
| 2011/0047603 A1 | 2/2011 | Gordon | |
| 2011/0183612 A1 * | 7/2011 | Bregman-Amitai | |
| | | | H04M 1/72412 |
| | | | 455/41.2 |
| 2012/0022968 A1 | 1/2012 | Manku | |
| 2012/0061458 A1 | 3/2012 | Bahr | |
| 2012/0198531 A1 * | 8/2012 | Ort | H04W 12/06 |
| | | | 709/227 |

(Continued)

*Primary Examiner* — Michael W Chao

(74) *Attorney, Agent, or Firm* — FLETCHER YODER PC

(57) ABSTRACT

A discovery broker may facilitate discovering and connecting devices, such as a sender device and receiver device, in a dense environment and/or a network with segmentation. The sender and receiver devices may be connected via the discovery broker based on a machine-readable image including connectivity information, digital wallet data including the connectivity information, or a domain name system.

20 Claims, 6 Drawing Sheets

(56) References Cited

U.S. PATENT DOCUMENTS

| | | | |
|---|---|---|---|
| 2012/0230305 A1 | 9/2012 | Barbu | |
| 2012/0284785 A1 | 11/2012 | Salkintzis | |
| 2012/0287290 A1* | 11/2012 | Jain | H04N 21/4367 |
| | | | 348/207.1 |
| 2013/0007853 A1 | 1/2013 | Gupta | |
| 2013/0167196 A1* | 6/2013 | Spencer | H04L 67/303 |
| | | | 370/254 |
| 2013/0221084 A1* | 8/2013 | Doss | H04W 12/06 |
| | | | 235/375 |
| 2013/0223279 A1* | 8/2013 | Tinnakornsrisuphap | |
| | | | H04W 12/50 |
| | | | 370/254 |
| 2013/0250801 A1 | 9/2013 | Kennedy | |
| 2013/0276075 A1* | 10/2013 | Gong | H04W 12/08 |
| | | | 726/5 |
| 2013/0333016 A1 | 12/2013 | Coughlin | |
| 2014/0134947 A1* | 5/2014 | Stouder-Studenmund | |
| | | | H04L 67/14 |
| | | | 455/41.2 |
| 2014/0208384 A1* | 7/2014 | Youssefian | H04L 63/0869 |
| | | | 726/3 |
| 2014/0344890 A1 | 11/2014 | Warrick | |
| 2014/0369232 A1* | 12/2014 | Kim | H04W 8/005 |
| | | | 370/254 |
| 2015/0038129 A1 | 2/2015 | Sundareswaran | |
| 2015/0049714 A1 | 2/2015 | Ghai | |
| 2015/0245281 A1* | 8/2015 | Beguin | H04W 12/35 |
| | | | 370/255 |
| 2016/0057161 A1* | 2/2016 | Li | H04L 63/0236 |
| | | | 726/1 |
| 2016/0087967 A1* | 3/2016 | Pang | H04W 76/11 |
| | | | 726/6 |
| 2016/0094557 A1 | 3/2016 | Kadur | |
| 2016/0135014 A1* | 5/2016 | Alharayeri | H04L 67/306 |
| | | | 455/456.3 |
| 2016/0269394 A1* | 9/2016 | Zhong | H04W 12/50 |
| 2016/0285841 A1 | 9/2016 | Marcy | |
| 2017/0171174 A1* | 6/2017 | Campagna | H04L 63/0876 |
| 2017/0201515 A1 | 7/2017 | Clark | |
| 2017/0230373 A1 | 8/2017 | Kadur | |
| 2017/0272317 A1 | 9/2017 | Singla | |
| 2017/0300732 A1* | 10/2017 | Likar | H04W 12/068 |
| 2018/0020353 A1* | 1/2018 | Bhandaru | H04L 9/088 |
| 2018/0183666 A1 | 6/2018 | Likar | |
| 2019/0012117 A1* | 1/2019 | Zhao | H04N 1/32122 |
| 2020/0004951 A1 | 1/2020 | Speak | |
| 2020/0100107 A1 | 3/2020 | Hsiao | |
| 2020/0153686 A1 | 5/2020 | Sarda | |
| 2020/0162915 A1 | 5/2020 | Dhammawat | |
| 2020/0204526 A1* | 6/2020 | Gehret | H04L 63/0428 |
| 2020/0228337 A1* | 7/2020 | Sumien | H04W 12/069 |
| 2020/0236737 A1 | 7/2020 | Ye | |
| 2021/0029543 A1 | 1/2021 | Nam | |
| 2021/0184929 A1 | 6/2021 | Brown | |
| 2021/0195416 A1 | 6/2021 | Mese | |
| 2021/0288936 A1 | 9/2021 | Grayson | |
| 2021/0377047 A1* | 12/2021 | Haque | H04L 9/0825 |
| 2022/0086735 A1 | 3/2022 | Zhang | |
| 2022/0104014 A1 | 3/2022 | Yoshikawa | |
| 2022/0159471 A1 | 5/2022 | Li | |
| 2022/0191950 A1 | 6/2022 | Ergen | |
| 2022/0303278 A1 | 9/2022 | Kirnapure | |
| 2023/0319917 A1 | 10/2023 | Hulse | |
| 2025/0036334 A1* | 1/2025 | Tsuji | H04L 9/30 |

* cited by examiner

BROKERED SERVICE DISCOVERY AND CONNECTION MANAGEMENT

BACKGROUND

The present disclosure relates generally to service discovery and enablement of network connection establishment, and more specifically to discovering and connecting electronic devices in communication-dense environments and/or on different subnets, virtual local area networks (VLANs), or physical networks.

Networking technologies such as Domain Name System (DNS), multi-cast Domain Name System (mDNS), or Domain Name System-Service Discovery (DNS-SD) enable service discovery and connection between electronic devices. Service discovery refers to automatic detection of devices (e.g., with little or no manual input) and respective services on a computer network. A client device (e.g., a smartphone, tablet, laptop) may rely on such networking technologies to detect network-enabled services running on a nearby accessory device (e.g., a smart television (TV), smart speaker, printer). For example, a smart TV may stream media provided from a smartphone based on mDNS enabling the smart TV and the smart phone to discover and connect with each other. By allowing devices to discover each other and wirelessly communicate with each other (e.g., by sharing media, screen mirroring) on a network, networking technologies reduce long configuration set ups and manual intervention. Devices may discover each other and information (e.g., services, internet protocol (IP) address, device names, device identifiers (IDs)) about each other via zero configuration service discovery techniques, such as mDNS, as long as the devices are on the same network and subnet. While networking technologies may enable effective service discovery on home or residential networks, where devices may be on the same network and subnet, enabling service discovery and pairing devices on a managed network, devices in a communication-dense environment, and/or devices on different subnets, VLANs, or physical networks may be more difficult.

Enterprises such as airports, hotels, restaurants, libraries, gyms, public transportation modes (e.g., trains) may be a part of a large network with devices on different networks, VLANs, or subnets, a complicated network, and/or a managed network. As used herein, a managed network may include an enterprise network used by an entity for computing and communications tasks, as well as storage of data. As such, a managed network may include client devices, server devices, routers, virtual machines, firewall, proxy servers, and the like. However, networking technologies such as mDNS are not conducive to discovering devices on a managed network, a large network with numerous devices, subnets, networks which restrict multicast traffic, and/or a network with segmentation. For instance, an employee in a business environment trying to connect with a display screen in a conference room may be provided with a long list of discoverable devices including all screens in all offices and conference rooms. This long list of discovered devices becomes difficult to navigate through and identify the desired specific screen within the specific conference room to connect with. In another example, when a hotel guest tries to connect to a smart screen in their hotel room, they may be provided with a long list of all smart screens in every hotel room discoverable on the network of the hotel. Further, complicated networks, such as managed networks may include one or more VLANS, firewalls, or physical networks, may not allow devices to establish connections with one another.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a discovery broker device includes a network interface transmits and receives signals to and from a sender device and a receiver device and at least one processor. The at least one processor may register the receiver device in response to exchanging discovery information with the receiver device via the network interface with the receiver device. Further, the at least one processor may cause the receiver device to display a machine-readable image comprising at least a portion of the discovery information. The at least one processor may receive a request from the sender device via the network interface to communicatively couple with the receiver device, where the request includes at least a portion of the discovery information. Moreover, the at least one processor may communicatively couple the sender device and the receiver device in response to authenticating the sender device.

In another embodiment, one or more tangible, non-transitory, computer-readable media include computer-executable instructions. Upon execution, the computer-executable instructions may cause one or more processors to register a receiver device in response to exchanging connectivity information with the receiver device. Further, the computer-executable instructions may cause the one or more processor to receive a first request to communicatively couple with a sender device via digital wallet data including at least a portion of the connectivity information, receive a second request from the sender device to communicatively couple with the receiver device, and communicatively couple the sender device and the receiver device in response to authenticating the sender device.

In yet another embodiment, a method includes configuring a domain name system for a network that includes a receiver device and a sender device. According to a method, one or more processors of a discovery broker may register a receiver device in response to exchanging discovery information with the receiver device. The method includes the discovery broker communicatively coupling to a sender device via a domain name system (DNS) network and receiving a request from the sender device to connect with the receiver device via a network interface. The method further includes the discovery broker communicatively coupling the sender device and the receiver device in response to authenticating the sender device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
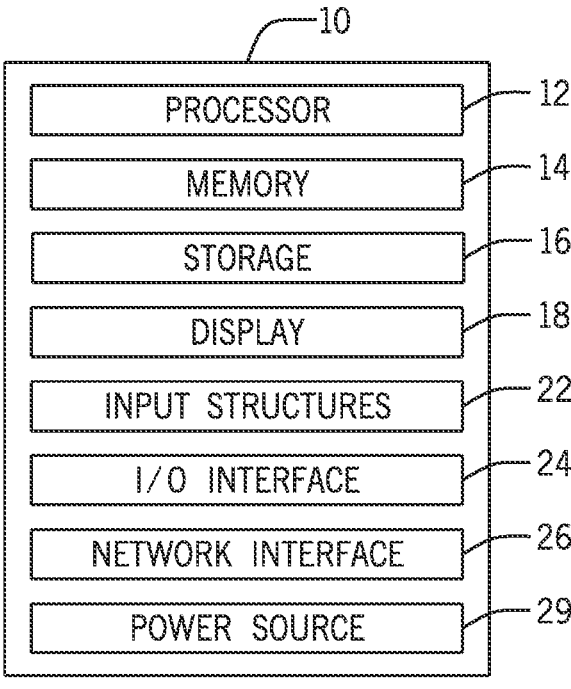
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to discovering and connecting devices using a discovery broker. It should be understood that the term "connect," as used herein, may include communicatively coupling. As mentioned above, network technologies such as DNS and mDNS may not be effective in discovering and connecting devices that are in a managed network, a large network, a complicated network, a multicast network, and/or a network with segmentation. As used herein, a multicast network may enable addressing or transmitting data to a group of destination devices concurrently or simultaneously. Further, network segmentation may include separating devices on a network via a firewall, a virtual local area network (VLAN), an air gap, and the like. Network segmentation may prevent devices that are isolated from each other and/or located on different networks, different subnets, or different VLANs from connecting with each other. Even networking technologies such as mDNS may not be effective in discovering and connecting devices when network segmentation exists. As such, a discovery broker may help discover and connect at least two devices (e.g., a sender device and a receiver device) that may be a part of a dense network (e.g., a managed network) or isolated from each other via network segmentation. Moreover, in some embodiments, a discovery broker may run on one device and enable discovery and connection of different on-device services. Further, the at least two devices may advertise or discover more than one service. For example, the receiver device may include an accessory that supports the HomeKit® and AirPlay® services. As used herein, the discovery broker may include software stored, implemented, and/or executed on a network device, a server, a router, a network orchestration layer, a network appliance that manages a firewall, and so forth. The discovery broker may separately connect to a sender device and a receiver device, and then facilitate connection between the sender device and the receiver device. As used herein, a sender device may include a client device, such as a smartphone, tablet, laptop, and the like, requesting a connection to a receiver device. The receiver device may include an accessory device, such as a smart TV, a smart speaker, a printer, and so forth, that supports a network-enabled service (e.g., AirPlay®). It should be appreciated that the discovery broker may facilitate discovery and connection of devices that are on separate subnets, separate VLANs, separate physical networks, or in a dense environment.

In some embodiments, the receiver device and the discovery broker may discover each other and respective information (e.g., discovery information) about each other, including Wi-Fi information, discovery broker network address, discovery broker name, discovery broker nonce, receiver device name and nonce, endpoints, discovery broker cryptographic information, receiver device cryptographic information, and so on. As used herein, a nonce may include a random or semi-random number that may be associated with a particular communication device for authentication purposes. The nonce may also be a fixed password. For example, the discovery broker may generate a server nonce and send it to a receiver device upon communicating with the receiver device. The server nonce may serve to protect the discovery broker from a network attack (e.g., valid data transmission to the discovery broker may be maliciously repeated or delayed). The server nonce may also be used for authentication of sender devices. Similarly, the receiver device may generate a client nonce and send the client nonce to the discovery broker. The client nonce may serve to protect the receiver device from a network attack. After connecting with the discovery broker, the receiver device may display a machine-readable image (e.g., a quick response (QR) code) with data that enables connection with the sender device. For example, by scanning the machine-readable image displayed by the receiver device, the sender device may receive at least a portion of the discovery information, connectivity information with the discovery broker, Wi-Fi credentials, and the like. In some embodiments, the sender device may connect with the discovery broker based on sending a request to connect with the discovery broker and/or the receiver device using the connectivity information (e.g., at least a portion of the discovery information) from the machine-readable image. In additional or alternative embodiments, the sender device may connect with the discovery broker based on digital wallet data stored in the sender device and/or accessible by the sender device (e.g., a user adding a wallet pass to the sender device). As used herein, digital wallet data (e.g., a wallet pass) includes information or content (e.g., an airline boarding pass, an event ticket, a coupon, a gift card, a credit card) associated with the discovery broker and stored in a software application of an electronic device (e.g., the sender device). In one embodiment, the sender device may connect with the discovery broker via DNS. The discovery broker may receive a request from the sender device to connect with the receiver device. In response to the sender device's request to connect with the receiver device, the discovery broker may authenticate the sender device (e.g., verify the sender device based on a client and/or discovery broker nonce). Based on verifying the sender device, the discovery broker may facilitate connecting the sender device to the receiver device, for example via a connectable Internet Protocol (IP) port. As used herein, the connectable IP port refers to a communication endpoint associated with an IP address of a host (e.g., receiver device) and type of transport protocol used for communication between the sender device and the receiver device. An IP address may include a unique number assigned to a device (e.g., receiver device) on a network and may serve as an identifier for the device. In response to the sender device being connected to the receiver device, the sender device may share media (e.g., audio and/or video content) to be outputted by the receiver device. The connectable IP port may also configure a firewall, a VLAN, a virtual private network (VPN), switch, router, or other network appliance or device to allow IP traffic between the sender device and the receiver device. For example, connecting the sender and the receiver devices via the discovery broker may enable the receiver device to stream media, screen mirror, print, and the like, based on inputs received from the sender device. Even though the receiver device and the sender device may be in a dense environment, on separate subnets, on separate VLANs, on separate physical networks, or in the presence of a firewall, the discovery broker enables connection and discovery of services between the devices.

FIG. 1 is a block diagram of an electronic device 10, according to embodiments of the present disclosure. The electronic device 10 may serve as a receiver device and/or a sender device. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processor 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10.

In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a 3$^{rd}$ generation (3G) cellular network, universal mobile telecommunication system (UMTS), 4$^{th}$ generation (4G) cellular network, long term evolution (LTE®) cellular network, long term evolution license assisted access (LTE-LAA) cellular network, 5$^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The power source 29 of the electronic device 10 may include any suitable source of power, such as a rechargeable lithium polymer (Li-poly) battery and/or an alternating current (AC) power converter.

Figure 2:
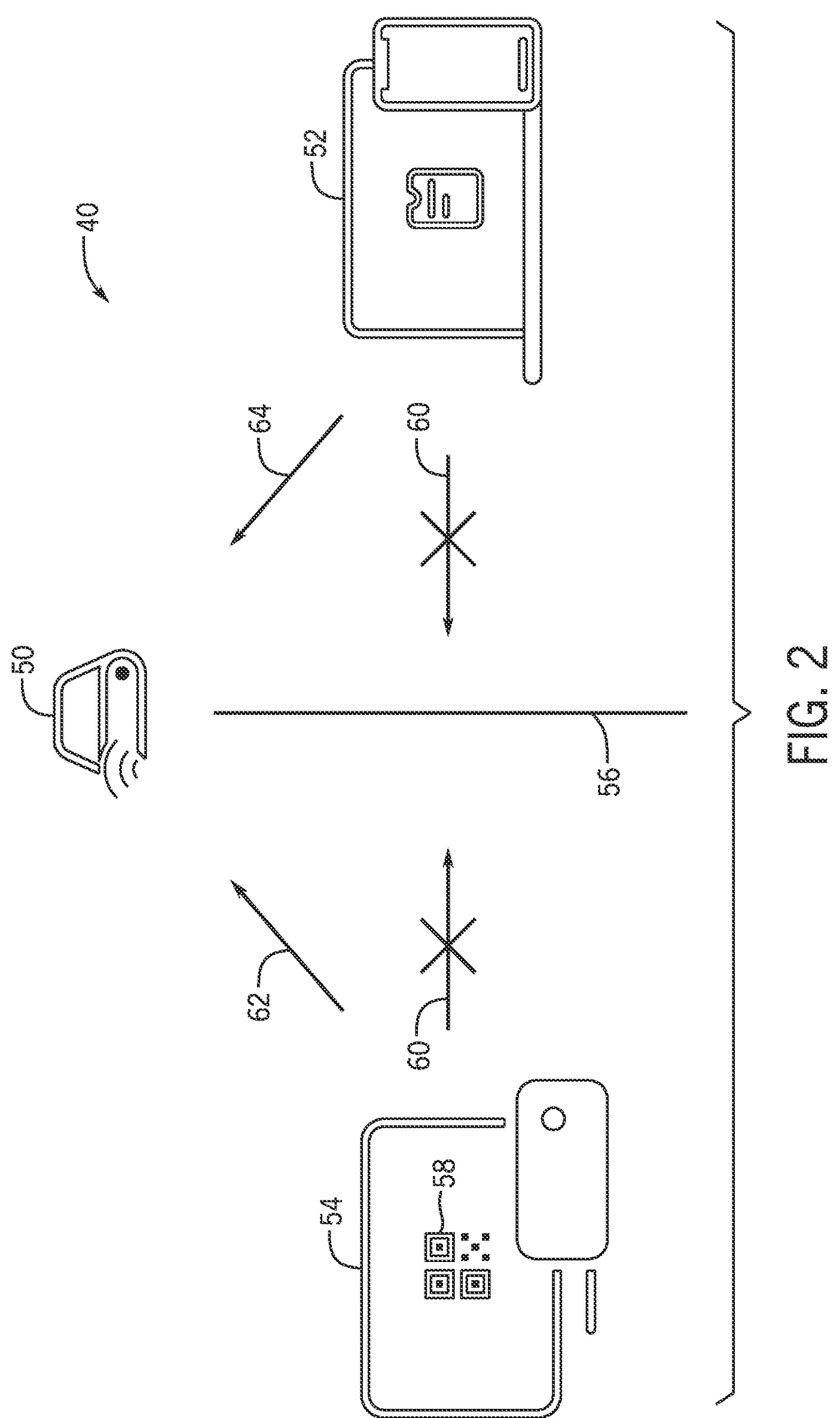
FIG. 2 is a schematic diagram of a brokered service discovery system, according to embodiments of the present disclosure.

A discovery broker may facilitate discovery and connection between at least two electronic devices 10 that may be on the same physical network, on different physical networks, on the same subnet, on different subnets, in a managed network, in a dense environment, in a residential network, in a multicast network, on the same VLAN, on different VLANs, and so forth. Examples of the electronic devices 10 may include a sender device (e.g., a smartphone, tablet, laptop, and the like), a receiver device (e.g., an accessory device, smart TV, smart speaker, printer, home system, and the like), and/or a device on which the discovery broker is executing (e.g., a discovery broker device, which may include a network device, a server, a router, a network orchestration layer, a network appliance that manages a firewall, a computing device (e.g., an iPad®, a MacBook®) and so forth). In particular, each of the sender device, the receiver device, and the discovery broker device may include the network interface 26 to transmit and receive signals from the other devices, and a processor 12 as described above. The sender device, the receiver device, the discovery broker, and other devices in a network may be part of a brokered service discovery system. Accordingly, FIG. 2 is a schematic diagram of a brokered service discovery system 40 with network segmentation. A receiver device 54 (e.g., a smart TV) and a sender device 52 (e.g., a smartphone, laptop) may be isolated from each other via a network division 56. Examples of the network division 56 include a firewall, a VLAN, an air gap, or any other structure or phenomenon that prevents or blocks communication between the devices 52, 54. In cases of network segmentation, because the receiver device 54 and the sender device 52 are located on different subnets, VLANs, or physical networks, the receiver device 54 and the sender device 52 may not directly communicate with each other (e.g., without an intervening device or mechanism), as illustrated by arrows 60. And, as mentioned above, even networking technologies such as DNS or mDNS may not be effective in discovering and connecting the receiver device 54 and the sender device 52, since the receiver device 54 and the sender device 52 may be located on different networks.

Instead, the brokered service discovery system 40 includes a discovery broker 50 to facilitate the discovery and connection between the receiver device 54 and the sender device 52. The discovery broker 50 may include software, firmware, and/or hardware disposed within or executing on a network device, a server, a router, a network orchestration layer, a network appliance that manages a firewall, and so forth (e.g., a discovery broker device). The discovery broker 50 may separately connect to the sender device 52 and the receiver device 54, and then facilitate communication between the sender device 52 and the receiver device 54. As indicated by arrow 62, the receiver device 54 and the discovery broker 50 may discover each other and exchange discovery information about each other, including Wi-Fi information, discovery broker name and nonce, server device name and nonce, endpoints, discovery broker certification, and so on. In some embodiments, a user associated with the sender device 52 may provide an indication (e.g., select or push a button) associated with a network-enabled service (e.g., AirPlay®) on the receiver device 54 to cause the receiver device 54 to display a machine-readable image 58. The machine-readable image 58 may include or provide connectivity data associated with the discovery broker 50 (e.g., at least a portion of the discovery information, Wi-Fi network information, Wi-Fi login information, endpoint, discovery broker name). Scanning the machine-readable image 58 and receiving the connectivity data (e.g., at least a portion of the discovery information) may enable the sender device 52 to connect with the discovery broker 50, as illustrated by arrow 64. That is, using the connectivity data from the machine-readable image 58, the sender device 52 may send a request to connect with the discovery broker 50 and/or the receiver device 54. Based on receiving the request to connect from the sender device 52 and authenticating the sender device 52, the discovery broker 50 may connect with the sender device 52.

In additional or alternative embodiments, the sender device 52 may connect with the discovery broker 50 via digital wallet data. For example, a user associated with the sender device 52 may add a wallet pass. In particular, the digital wallet data (e.g., wallet pass) may include connectivity data associated with the discovery broker 50 (e.g., Wi-Fi network information, Wi-Fi login information, endpoint, discovery broker name, or the like) that enables the sender device 52 to automatically connect (e.g., with little to no manual or user input) with the discovery broker 50. Connecting the sender device 52 and the discovery broker 50 via the digital wallet data may enable the user associated with the sender device 52 to do so without having to provide a manual indication (e.g., selecting an option or pushing a button) associated with the network-enabled service (e.g., AirPlay®) on the receiver device 54 in order to cause the receiver device 54 to display the machine-readable image 58. Instead, the discovery broker 50 may instruct the receiver device 54 to display the machine-readable image 58 based on determining that the sender device 52 desires a connection with the receiver device 54. Scanning the machine-readable image 58, which may include discovery information associated with the receiver device 54 (e.g., receiver device name, endpoints, client nonce, or the like) may enable the sender device 52 to be authenticated with respect to the receiver device 54. The discovery information from the machine-readable image 58 may provide the sender device 52 with information for connecting to the receiver device 54. For example, the discovery information may include an internet protocol (IP) address of the receiver device 54, which provides the sender device 52 a way to connect with the receiver device 54.

In some embodiments, upon connecting with the sender device 52, the discovery broker 50 may receive a request from the sender device 52 to connect with the receiver device 54. In response to the request, the discovery broker 50 may authenticate the sender device 52 (e.g., verify that a sender device presents the correct password or authentication information). Based on verifying the sender device 52, the discovery broker 50 may facilitate connecting the sender device 52 and the receiver device 54, for example, via a connectable IP port, as described in further detail below.

Figure 3:
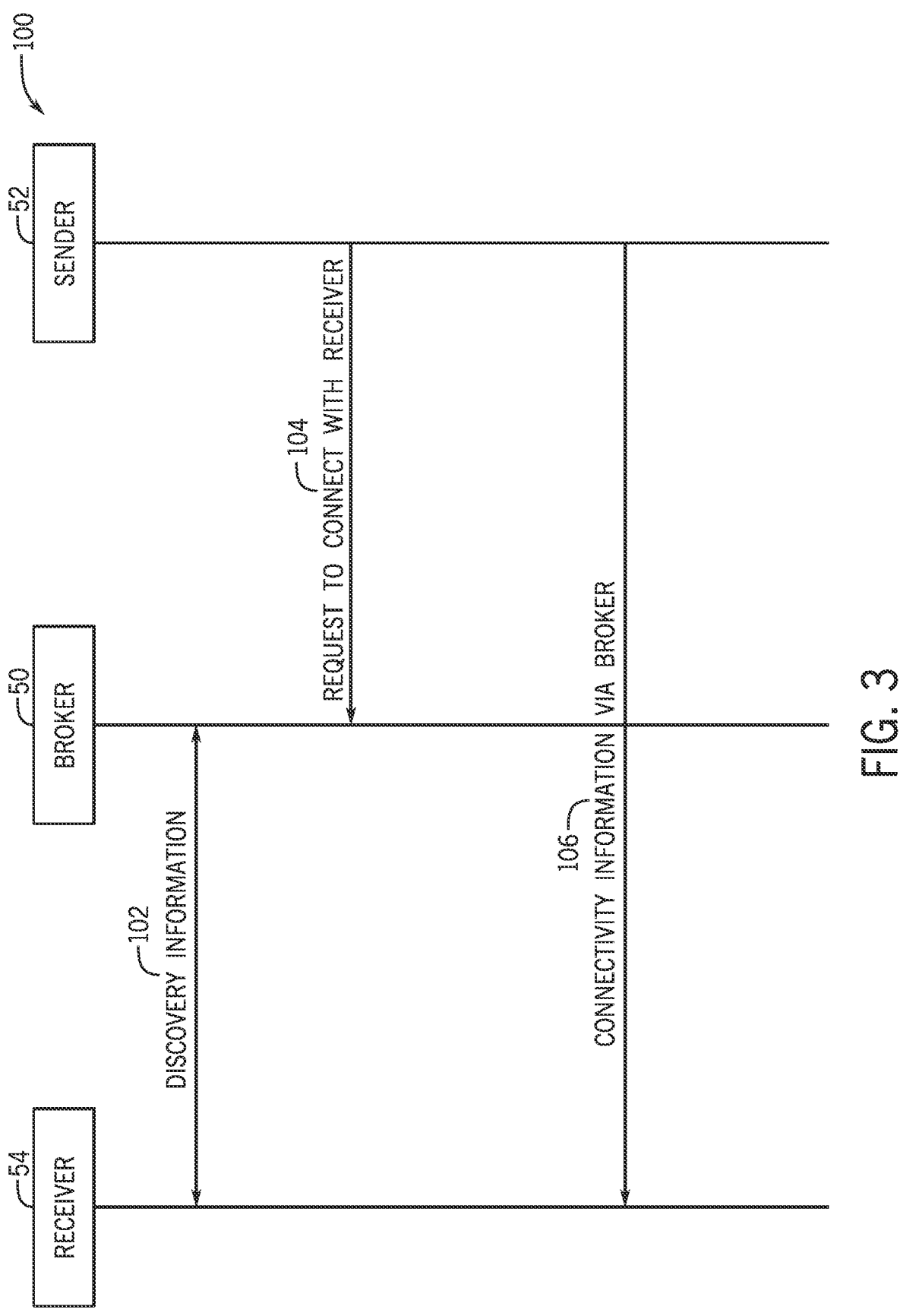
FIG. 3 is a flow diagram of a process for connecting a sender device and a receiver device via a discovery broker, according to embodiments of the present disclosure.

With the preceding in mind, FIG. 3 is a flow diagram of a process 100 for connecting the sender device 52 and the receiver device 54 via the discovery broker 50, according to embodiments of the present disclosure. The process 100 may be performed at least in part by one or more software components, such as the discovery broker 50, software applications of one or more electronic devices 10 (e.g., the sender device 52, the receiver device 54), and the like. While the process 100 is described using steps in a specific sequence, it should be understood that the present disclosure contemplates that the described steps may be performed in different sequences than the sequence illustrated, and certain described steps may be skipped or not performed altogether.

As indicated by arrow 102, the receiver device 54 and the discovery broker 50 may exchange discovery information. In some embodiments, the receiver device 54 (e.g., a smart TV) may search for and discover the discovery broker 50. In additional or alternative embodiments, the discovery broker 50 may search for and discover the receiver device 54. Discovery information may include names and/or identifiers (IDs) of the discovery broker 50 and/or the receiver device 54, endpoints (e.g., logical endpoints of a protocol layer associated with the discovery broker 50 and/or receiver device 54, such as Ethernet endpoints, Fiber Channel endpoints, Fiber Distributed Data Interface (FDDI) endpoints), Wi-Fi credentials, and so forth. For example, after discovering each other, the discovery broker 50 may receive information, such as a receiver name, receiver ID, network-enabled services (e.g., AirPlay®, AirPrint®) associated with the receiver device 54, endpoints from the receiver device 54, and so on. The receiver device 54 may receive information, such as a discovery broker name, discovery broker certification, Wi-Fi credentials, or the like.

In addition to connecting with the receiver device 54, the discovery broker 50 may also connect with the sender device 52. The sender device 52 may connect with the discovery broker 50 using the machine-readable image 58, digital wallet data, or a DNS. As indicated by arrow 104, the discovery broker 50 may receive a request from the sender device 52 to connect with the discovery broker 50 and/or receiver device 54.

Based on receiving the request from the sender device 52, the discovery broker 50 may authenticate the sender device 52 and connect the sender device 52 and the receiver device 54. As indicated by arrow 106, the discovery broker 50 may facilitate communication between the sender device 52 and the receiver device 54 via, for example, a connectable IP port. That is, the receiver device 54 may include an IP port, and the discovery broker 50 may send connection information to the sender device 52 that enables the sender device 52 to connect to the IP port. Through the discovery broker 50, the sender device 52 may discover the receiver device 54 to, for example, receive media content (e.g., in the case of a smartphone sender device 52 connected to a smart TV receiver device 54 that streams content, such as an AirPlay® receiver device 54) or send a command via a wireless, network-based protocol (e.g., in the case of a smartphone sender device 52 connected with a printer receiver device 54, and the command is sent via AirPrint®).

In this manner, the process 100 may enable the discovery broker 50 to connect the receiver device 54 and the sender device 52 even when the receiver device 54 and the sender device 52 may be in a communication-dense environment, on different networks, on different VLANs, or on different subnets. In a communication-dense environment, the discovery broker 50 may serve as an intermediary between the sender device 52 and the receiver device 54. That is, the discovery broker 50 may separately connect with the sender device 52 and the receiver 54 and then facilitate a connection between the sender device 52 and the receiver device 54. Establishing a connection between the sender device 52 and the receiver device 54 via the discovery broker 50 may prevent the sender device 52 and the receiver 54 from attempting to discover and establish a connection with each other amongst numerous other devices in the communication-dense environment. In this way, the discovery broker 50 reduces the burden of the sender device 52 and the receiver device 54 for discovery and establishing connections with each other.

Further, the discovery broker may facilitate discovery and connection with the sender device 52 and the receiver device 54 even though the sender device 52 may be located on a different network, subnet, or VLAN than the receiver device 54. In some cases, the sender device 52 located on a first network may not directly connect with the receiver device 54 located on a second network. As such, the discovery broker 50 facilitates a connection between the sender device 52 and the receiver device 54, despite the sender device 52 and the receiver device 54 being on different networks.

Figure 4:
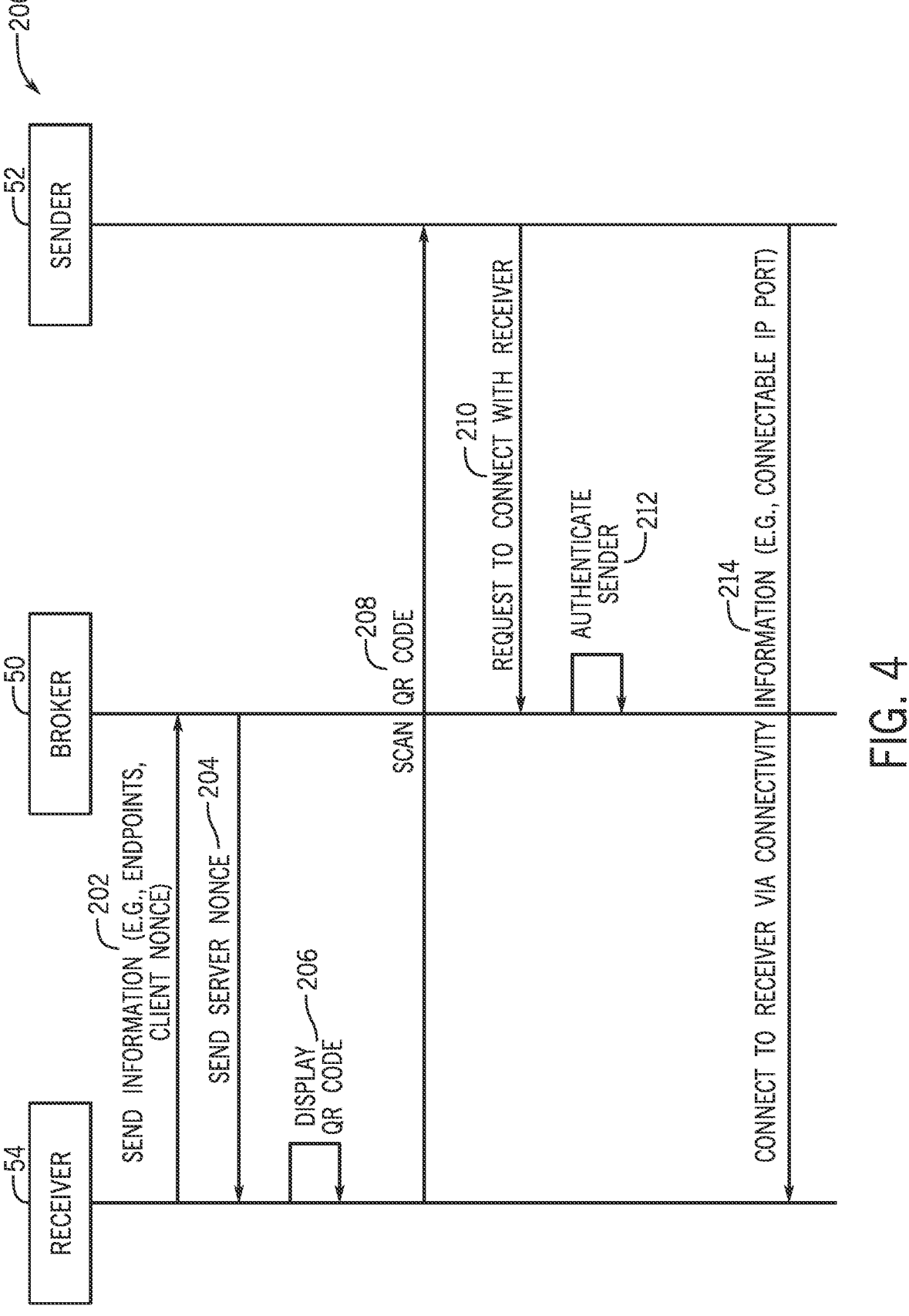
FIG. 4 is a flow diagram of the process of FIG. 3, where the sender device connects to the discovery broker by scanning a machine-readable image providing discovery information, according to embodiments of the present disclosure.

In some embodiments, the discovery broker 50 and the sender device 52 may discover each other in response to the sender device 52 scanning the machine-readable 58 image including or providing connectivity information associated with the discovery broker 50. For example, FIG. 4 is a flow diagram of a process 200 for connecting the sender device 52 and the receiver device 54 via the discovery broker 50 based on sender device 52 discovering the discovery broker 50 using the machine-readable image 58. In one embodiment, the sender device 52 may include a smartphone or any suitable device seeking a connection with the receiver device 54, which may include a smart TV (e.g., in a hotel room) or an airplane TV. In some embodiments, the receiver device 54 may include an electronic display to display the machine-readable image 58 (e.g., a QR code, barcode, hyperlink). In additional or alternative embodiments, the machine-readable image 58 may be in a tangible or physical form (e.g., a QR code, barcode, or hyperlink printed on paper).

By scanning the machine-readable image 58, the sender device 52 receives at least a portion of the connectivity information associated with the discovery broker 50. Using at least the portion of the connectivity information, the sender device 52 may send a request to the discovery broker 50 for connection. In some embodiments, the sender device 52 may send a request to the discovery broker 50 that includes at least the portion of the connectivity information and a connection with the discovery broker 50. Based on receiving the request for connection from the sender device 52 and authenticating the sender device 52, the discovery broker 50 may connect to the sender device 52, and in turn facilitate connection between the sender device 52 and the receiver device 54. The discovery broker 50 may facilitate connection between the sender device 52 and the receiver device 54 such that the receiver device 54 (e.g., a smart TV, a content streaming device) may stream content based on input from the sender device 52 (e.g., a smartphone), for example. The process 200 may be performed at least in part by one or more software components, such as the discovery broker 50, software applications of one or more electronic devices 10 (e.g., the sender device 52, the receiver device 54), and the like. While the process 200 is described using steps in a specific sequence, it should be understood that the present disclosure contemplates that the described steps may be performed in different sequences than the sequence illustrated, and certain described steps may be skipped or not performed altogether.

As mentioned above, the receiver device 54 and the discovery broker 50 may discover each other and exchange respective information via a machine-readable image 58 (e.g., QR code), manual configuration (e.g., through mDNS, DNS service discovery (DNS-SD)), or the like. As indicated by arrow 202, the discovery broker 50 may receive a receiver name, a receiver ID, services supported by the receiver device 54, an endpoint, a client nonce, and the like, from the receiver device 54. As mentioned above, a nonce may include a random or semi-random number that may be attached to a particular communication for authentication purposes. In particular, the client nonce may serve to protect the receiver device 54 from a network attack (e.g., valid data transmission to the discovery broker may be maliciously repeated or delayed) and/or a fraudulent event. The discovery broker 50 may register the receiver device 54 based on information, such as the client nonce, received from the receiver device 54. As indicated by arrow 204, the discovery broker 50 may generate a server nonce, and send the server nonce to the receiver device 54. The server nonce may serve to protect the discovery broker from a network attack and/or a fraudulent event. The discovery broker 50 may also or alternatively send other information related to the discovery broker 50, such as a discovery broker name, a discovery broker ID, Wi-Fi credentials, an endpoint, and the like, to the receiver device 54.

In some embodiments, a user associated with the sender device 52 may provide an indication (e.g., push or select a button) associated with a network-enabled service (Air-Play®) on the receiver device 54, thereby causing the receiver device to display the machine-readable image 58. As indicated by arrow 206, the receiver device 54, such as a smart TV, displays the machine-readable image 58, which may provide connectivity information with the discovery broker 50, based on receiving input from the discovery broker 50 or the user associated with the sender device 52. The connectivity information of the machine-readable image 58 may include a name, ID, endpoint, Wi-Fi credentials, and the like, associated with the discovery broker 50.

As indicated by arrow 208, the user may use the sender device 52 to scan the machine-readable image 58 (e.g., using a camera or other image sensor of the sender device 52 or communicatively coupled to the sender device 52) displayed by the receiver device 54. By scanning the machine-readable image 58, the sender device 52 may receive at least a portion of the connectivity information associated with the discovery broker 50.

As indicated by arrow 210, using at least the portion of the connectivity information, the sender device 52 may send the discovery broker 50 a request to connect with the discovery broker 50 and/or receiver device 54. In some embodiments, the request may include at least the portion of the connectivity information and a connection request with the discovery broker 50. Based on the request, the discovery broker 50 may authenticate the sender device 52. As indicated by arrow 212, the discovery broker 50 may verify that the name of the sender device 52 corresponds to a client nonce associated with the sender device 52. In some embodiments, the discovery broker 50, through the receiver device 54, may request additional information from the sender device 52 to authenticate the sender device 52. Such additional information may serve to ensure that the user and/or the sender device 52 is authorized to use the receiver device 54, and may include identification information, member information, location information, seat information, ticket information, account information, group information, and so on. For example, in the case where the receiver device 54 is on an airplane (e.g., a display on the airplane, such as a seatback display), the user may use the sender device 52 to scan a code (e.g., the machine-readable image 58) to connect with the discover broker 50, pursuant to arrow 208. In this example, the discovery broker 50 may cause the receiver device 54 to display a user interface on its display requesting a seat number or identifier of the user, a name of the user, a flight number, a confirmation number, or the like, that ensures that the user is authorized to use the receiver device 54.

As indicated by arrow 214, the discovery broker 50 facilitates connecting the sender device 52 and the receiver device 54 upon successfully authenticating the sender device 52. For example, the discovery broker 50 may send the sender device 52 connectivity information associated with the receiver device 54 that enables the sender device 52 to connect with the receiver device 54. Such connectivity information may include any suitable identifiable information of the receiver device 54, such as an IP address of a connectable IP port of the receiver device 54, a device name of the receiver device 54 (e.g., as registered with a network), a device identifier of the receiver device 54 (e.g., as registered with a network), and so on. In this manner, the process 200 may enable the discovery broker 50 to facilitate connecting the receiver device 54 and the sender device 52 when the receiver device 54 displays the machine-readable image 58 and/or the sender device 52 scans the machine-readable image 58.

Figure 5:
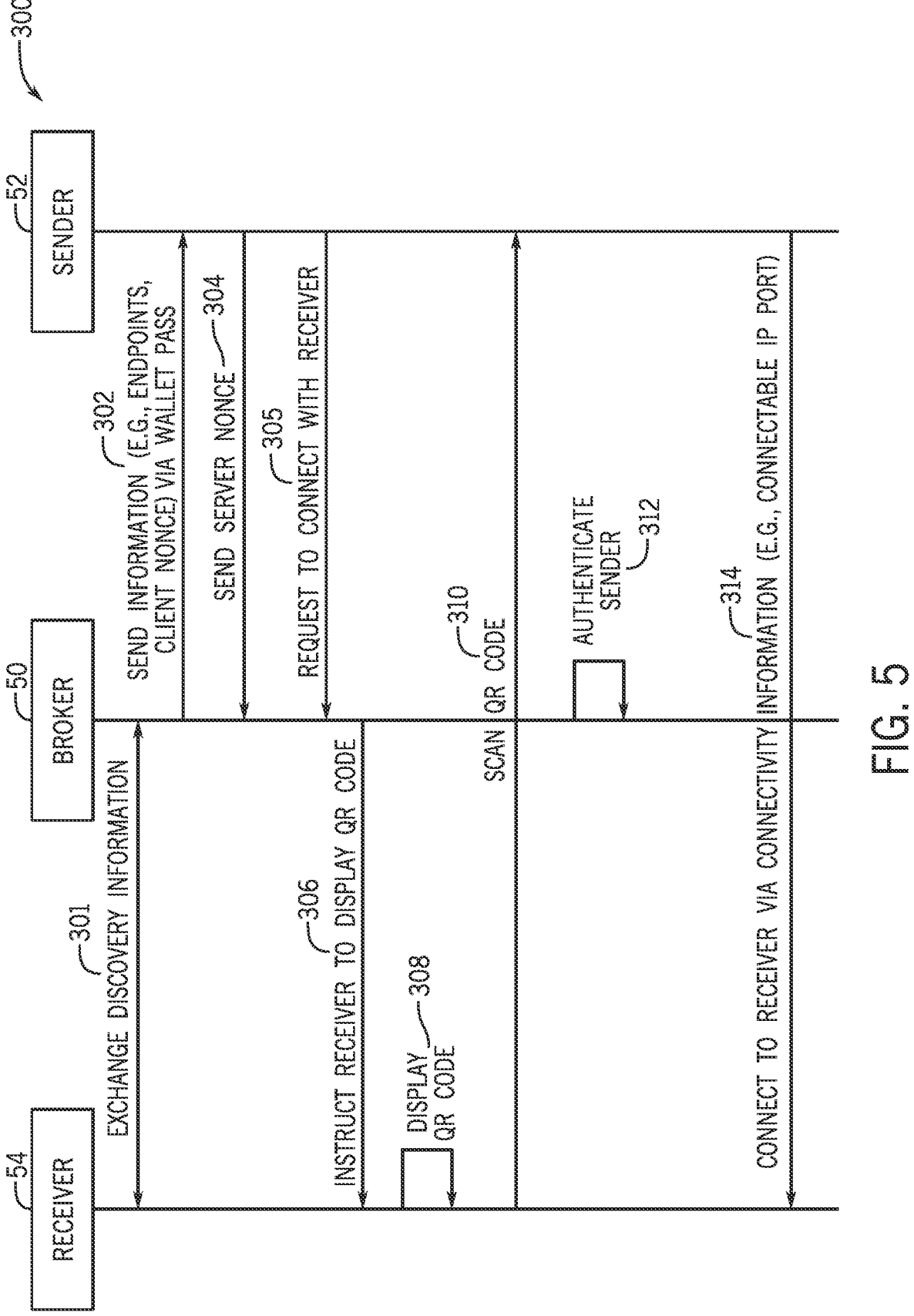
FIG. 5 is a flow diagram of the process of FIG. 4, where the sender device connects to the discovery broker based on digital wallet data (e.g., connectivity information from a wallet pass), according to embodiments of the present disclosure.

FIG. 5 is a flow diagram of a process 300 for connecting the sender device 52 and the receiver device 54 via the discovery broker 50 based on the sender device 52 being connected to the discovery broker 50 via digital wallet data. The digital wallet data (e.g., wallet pass) may be provided via a hyperlink, an email application, or a software application (e.g., a third party software application or a mobile application), such as an airline application, a hotel application, and so forth. For example, by checking in for a flight or a hotel, the sender device 52 may receive the digital wallet data via a link, email, or a software application. Based on the digital wallet data, such as a seat number on a flight or a room number at a hotel, the digital wallet data may enable the sender device 52 (e.g., smartphone) to connect with the receiver device 54 (e.g., a TV on an airplane or smart TV in a hotel) via the discovery broker 50. The process 300 may be performed at least in part by one or more software components, such as the discovery broker 50, respective software applications of one or more electronic devices 10 (e.g., the sender device 52, the receiver device 54), and the like. While the process 300 is described using steps in a specific sequence, it should be understood that the present disclosure contemplates that the described steps may be performed in different sequences than the sequence illustrated, and certain described steps may be skipped or not performed altogether.

Similar to FIG. 4 and as indicated by arrow 301, the receiver device 54 and the discovery broker 50 may discover each other and exchange respective information. In some embodiments, the sender device 52 may connect with the discovery broker 50 via digital wallet data (e.g., a user associated with the sender device 52 adding a wallet pass). The digital wallet data may include connectivity data associated with the discovery broker 50 that enables the sender device 52 to automatically connect (e.g., with little to no manual or user input) with the discovery broker 50. As indicated by arrow 302, the sender device 52 may receive discovery information such as Wi-Fi network information, Wi-Fi login information, endpoint, and discovery broker name from the discovery broker 50. In some embodiments, the sender device 52 may receive the Wi-Fi network information and Wi-Fi login information when the sender device 52 and the receiver device 54 are on different subnets, VLANS, or physical networks. When the sender device 52 and the receiver device 54 are not on the same network and subnet, the sender device 52 may use the Wi-Fi network information and Wi-Fi login information to join the same network and subnet as the receiver device 54. For example, the Wi-Fi network information may include an IP address of the receiver device 54 that enables the sender device 52 to join the same network and subnet as the receiver device 54.

As indicated by arrow 304, the discovery broker 50 may receive data, such as a nonce from the sender device 52. In some embodiments, the discovery broker 50 may receive the data from the sender device 52 in the form of a first request. That is, the sender device 52 may send a first request that includes the nonce (e.g., at least a portion of the discovery information) to establish a connection with the discovery broker 50. It should be appreciated that automatically connecting with the discovery broker 50 via digital wallet data may be helpful in discovering and connecting devices in a large, complicated network, such as an in-flight entertainment system. For example, an in-flight entertainment system may include numerous receiver devices 54 in the form of TVs. Rather than having each TV display a respective machine-readable image 58 that may be scanned by a sender device 52 of a user desiring to connect with a TV, the sender device 52 of the user may automatically (e.g., with little to no manual input) connect with the TV based on the digital wallet data. For example, the digital wallet data a seat number of the user. Digital wallet data, such as the seat number of the user, may enable the sender device 52 (e.g., the user's smartphone) to automatically connect with the discovery broker 50, and in turn the TV associated with the user's seat on a flight.

As indicated by arrow 305, the discovery broker 50 may receive a second request from the sender device 52 to connect with a particular receiver device 54. As indicated by arrow 306, the discovery broker 50 may instruct the receiver device 54 to display the machine-readable image 58 based on the second request. As such, and as indicated by arrow 308, the receiver device 54 may display the machine-readable image 58. The machine-readable image 58 may include discovery information associated with the receiver device 54 (e.g., at least a portion of the discovery information, receiver device name, endpoints, client nonce).

As indicated by arrow 310, the sender device 52 may scan the machine-readable image 58, which may include or provide discovery information associated with the receiver device 54 so that the sender device 52 may be authenticated with respect to the receiver device 54 and/or join the same network and subnet as the receive device 54. Further, as indicated by arrow 312, the discovery broker 50 may authenticate the sender device 52 (e.g., verify that the name of the sender device 52 corresponds to a nonce).

As indicated by arrow 314, the discovery broker 50 facilitates connecting the sender device 52 and the receiver device 54 upon successfully authenticating the sender device 52. For example, the discovery broker 50 may send the sender device 52 connectivity information associated with the receiver device 54 that enables the sender device 52 to connect with the receiver device 54. Such connectivity information may include any suitable identifiable information of the receiver device 54, such as an IP address of a connectable IP port of the receiver device 54, a device name of the receiver device 54 (e.g., as registered with a network), a device identifier of the receiver device 54 (e.g., as registered with a network), and so on. In this manner, the process 300 may enable the discovery broker 50 to facilitate connecting the receiver device 54 and the sender device 52 using digital wallet data, and thereby reducing manual input from a user.

Figure 6:
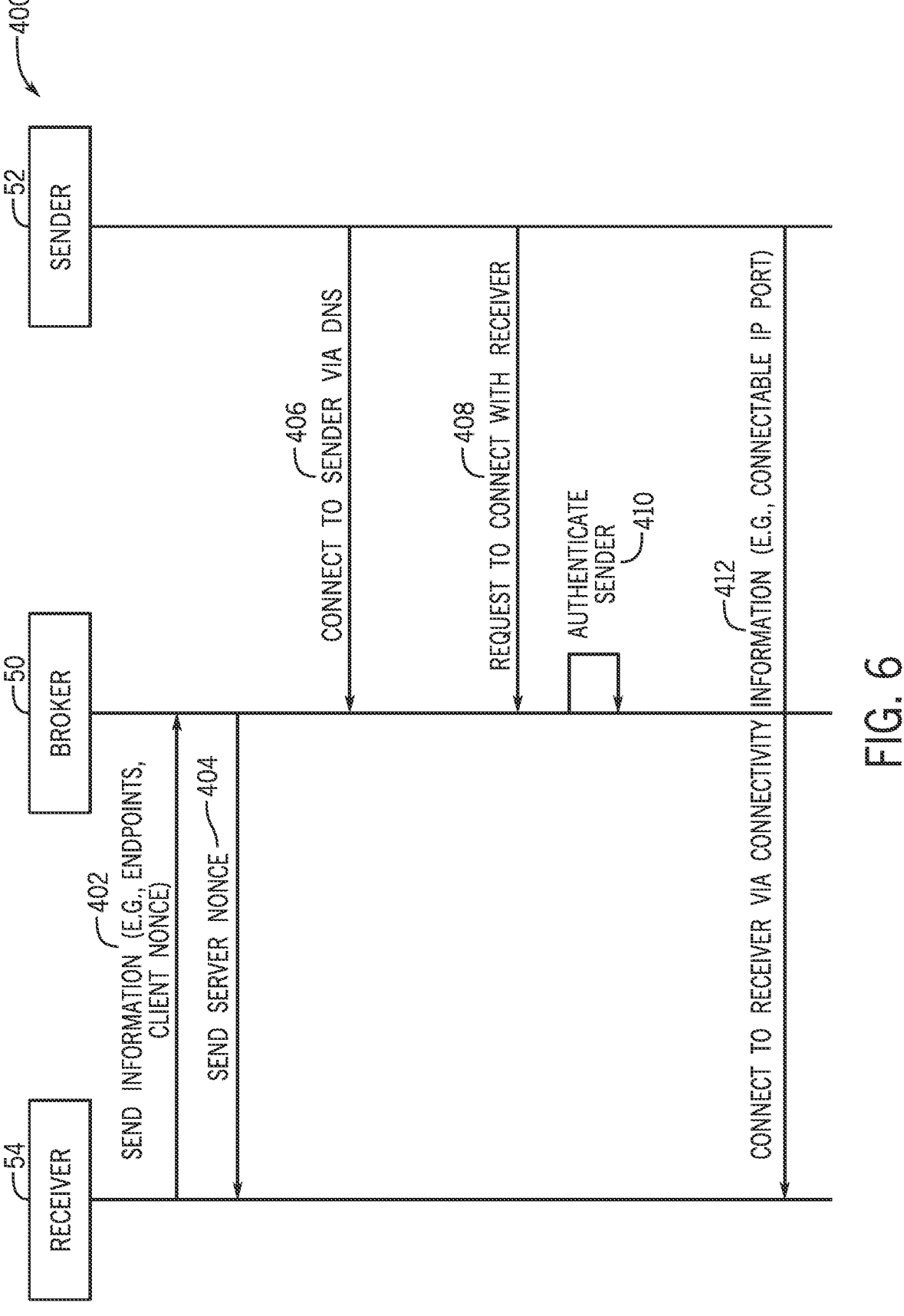
FIG. 6 is a flow diagram of the process of FIG. 3, where the sender device discovers the discovery broker via DNS, according to embodiments of the present disclosure.

With the preceding in mind, FIG. 6 is a flow diagram of a process 400 for connecting the sender device 52 and the receiver device 54 via the discovery broker 50 based on the sender device 52 being connected to the discovery broker 50 via DNS. Connecting the sender device 52 and the discovery broker 50 may be useful in cases where the machine-readable image 58 cannot be displayed by the receiver device 54 and/or the sender device 52 may not be able to scan the machine-readable image 58. In one embodiment, the receiver device 54 may include a streaming device without a display. In another embodiment, the receiver device 54 may be a disposed in or associated with a crowded or dense environment (e.g., a TV in a gym, a hotel, or common area), where displaying the machine-readable image 58 via the receiver device 54 may not be suitable. For example, it may not be suitable to display the machine-readable image 58 on a TV in a gym, where many people may try to connect with the TV at the same time. In additional or alternative scenarios where this embodiment may be useful, the sender device 52 may include a broken camera, may not have a camera, or may be a device (e.g., MacBook®) that is not convenient for scanning the machine-readable image 58. The process 400 may be performed at least in part by one or more software components, such as the discovery broker 50, respective software applications of one or more electronic devices 10 (e.g., the sender device 52, the receiver device 54), and the like. While the process 400 is described using steps in a specific sequence, it should be understood that the present disclosure contemplates that the described steps may be performed in different sequences than the sequence illustrated, and certain described steps may be skipped or not performed altogether.

In the process 400, arrows 402, 404, 408, 410, and 412 are similar to those described in arrows 202, 204, 210, 212, and 214 of FIG. 4, respectively. Unlike the process 200 of FIG. 4, the sender device 52 is connected to the discovery broker 50 via DNS. In some cases, the sender device 52 may not have the capability to scan the machine-readable image 58 due to not having a camera, a broken camera, and so forth. In other cases, the receiver device 54 may include a streaming device without a display and thus be incapable of displaying the machine-readable image 58. As mentioned above, it may not be convenient to scan the machine-readable image 58 via certain types of receiver device 54 (e.g., MacBook®). In some cases, it may not may be suitable to display the machine-readable image 58 via a receiver device 54 in a crowded environment. As such, the sender device 52 may be connected to the discovery broker 50 via DNS. As used herein, DNS is a hierarchical and decentralized naming system used to identify devices and services through internet protocol (IP) networks. A network administrator may configure or set up DNS for an IP network that includes the receiver device 54 and the sender device 52 before at least some steps described by arrows 402, 404, 406, 408, 410, 412 may be performed. To enable the discovery broker 50 to connect the sender device 52 and the receiver device 54 via DNS, the network administration may configure DNS in the IP network. Configuration information, such as whether dynamic updates are enabled in the IP network, the name of a domain to update, cryptographic security credentials for authorizing updates to the domain, and so forth, may enable the network administrator to configure DNS in the IP network.

As indicated by arrow 406, the sender device 52 may search for and connect with the discovery broker 50 via DNS. In this manner, the process 200 may enable the discovery broker 50 to connect the receiver device 54 and the sender device 52 using DNS when the receiver device 54 may not include a display and/or the sender device 52 may not include scanning capabilities. Further, in cases where scanning the machine-readable image 58 may not be an option, a field may be displayed (e.g., on the display 18 of the receiver device 54) that may receive a code entered on via the sender device 52. The code may include information that enables authentication between the sender device 52 and the discovery broker 50 and/or between the receiver device 54 and the discovery broker 50 to validate the exchange of connectivity and/or discovery information (e.g., client and server nonces) It should be noted that the processes of FIGS. 4, 5, and 6 are examples for discovering services and connecting devices via a discovery broker 50.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A discovery broker device comprising:
a network interface configured to transmit and receive signals between a sender device and a receiver device; and
at least one processor configured to:
cause the discovery broker device to communicatively couple to the receiver device;
register the receiver device in response to exchanging discovery information with the receiver device using the network interface;
cause the discovery broker device to transmit a signal configured to cause the receiver device to display a machine-readable image comprising at least a portion of the discovery information associated with the discovery broker device to enable the sender device to scan the machine-readable image to communicatively couple to the discovery broker device;
receive a request from the sender device using the network interface to communicatively couple with the receiver device, the request associated with display of the machine-readable image and comprising at least the portion of the discovery information; and
cause the discovery broker device to transmit connectivity information to the sender device in response to authenticating the sender device, the connectivity information enabling the sender device to communicatively couple to the receiver device to share media content with the receiver device, transmit a command to the receiver device, or both.

2. The discovery broker device of claim 1, wherein the discovery information comprises Wi-Fi credentials and network information, endpoints, a discovery broker name, a client nonce associated with the receiver device, or a server nonce associated with the discovery broker device.

3. The discovery broker device of claim 1, wherein the connectivity information is associated with a connectable internet protocol port of the receiver device.

4. The discovery broker device of claim 1, wherein the at least one processor is configured to cause the receiver device to display the machine-readable image comprising at least the portion of the discovery information based on a user input associated with the sender device.

5. The discovery broker device of claim 1, wherein the machine-readable image comprises a quick response code, a barcode, or a hyperlink.

6. The discovery broker device of claim 1, wherein the at least one processor is configured to exchange the discovery information with the receiver device based at least in part on by:

receiving a client nonce, an endpoint, or Wi-Fi network information from the receiver device; and causing the discovery broker device to transmit a server nonce to the receiver device.

7. The discovery broker device of claim 1, wherein the at least one processor is configured to authenticate the sender device based on a client nonce associated with the sender device.

8. The discovery broker device of claim 1, wherein the sender device is communicatively coupled to a first network and the receiver device communicatively coupled to a second network using a connectable internet protocol port, wherein the first network is different from the second network.

9. The discovery broker device of claim 8, wherein the sender device is configured to join the second network in response to receiving the discovery information comprising Wi-Fi credentials and network information from the discovery broker device, wherein the network information comprises an Internet protocol address of the receiver device.

10. The discovery broker device of claim 1, wherein the at least one processor is configured to:

cause the discovery broker device to communicatively couple to the receiver device using a first connection; and cause the discovery broker device to communicatively couple with the sender device using a second connection that is separate from the first connection.

11. The discovery broker device of claim 1, wherein the at least one processor is configured to cause the receiver device to display the machine-readable image to enable the sender device to scan the machine-readable image to receive at least the portion of the discovery information.

12. One or more tangible, non-transitory, computer-readable media, comprising computer-executable instructions that, when executed by processing circuitry of a discovery broker device, cause the processing circuitry to:

cause the discovery broker device to communicative couple to a receiver device;

register the receiver device based on exchanging discovery information with the receiver device;

cause the receiver device to display a machine-readable image comprising at least a portion of the discovery information associated with the discovery broker device to enable a sender device to scan the machine-readable image to communicatively couple to the discovery broker device;

receive a request from the sender device to communicatively couple with the receiver device, the request associated with display of the machine-readable image and comprising at least the portion of the discovery information;

generate connectivity information associated with the receiver device for transmission to the sender device; and cause transmission of the connectivity information to the sender device in response to authenticating the sender device, the connectivity information enabling the sender device to communicatively couple to the receiver device to share media content with the receiver device, transmit a command to the receiver device, or both.

13. The one or more tangible, non-transitory, computer-readable media of claim 12, wherein the discovery information comprises Wi-Fi credentials and network information, endpoints, a discovery broker name, a client nonce associated with the receiver device, or a server nonce associated with the discovery broker device.

14. The one or more tangible, non-transitory, computer-readable media of claim 12, wherein the connectivity information is associated with a connectable internet protocol port of the receiver device.

15. The one or more tangible, non-transitory, computer-readable media of claim 12, wherein the machine-readable image comprises a quick response code, a barcode, or a hyperlink.

16. The one or more tangible, non-transitory, computer-readable media of claim 12, wherein the instructions, when executed by the processing circuitry, cause the processing circuitry to authenticate the sender device based on a client nonce associated with the sender device.

17. The one or more tangible, non-transitory, computer-readable media of claim 12, wherein the sender device is communicatively coupled to a first network and the receiver device communicatively coupled to a second network using a connectable internet protocol port, wherein the first network is different from the second network.

18. The one or more tangible, non-transitory, computer-readable media of claim 17, wherein the sender device is configured to join the second network based on receiving the discovery information comprising Wi-Fi credentials and network information from the discovery broker device, wherein the network information comprises an Internet protocol address of the receiver device.

19. A method comprising:

causing a discovery broker device to communicatively couple to a receiver device;

registering the receiver device based on exchanging discovery information with the receiver device;

causing the receiver device to display a machine-readable image comprising at least a portion of the discovery information associated with the discovery broker device to enable a sender device to scan the machine-readable image to communicatively couple to the discovery broker device;

receiving a request from the sender device to communicatively couple with the receiver device, the request associated with display of the machine-readable image and comprising at least the portion of the discovery information; and preparing connectivity information for transmission to the sender device in response to authenticating the sender device, the connectivity information enabling the sender device to communicatively couple to the receiver device to share media content with the receiver device, transmit a command to the receiver device, or both.

20. The method of claim 19, wherein exchanging the discovery information with the receiver device comprises:

receiving a client nonce, an endpoint, or Wi-Fi network information from the receiver device; and preparing a server nonce for transmission to the receiver device.

* * * * *